United States Patent
Liao et al.

(10) Patent No.: US 9,635,834 B2
(45) Date of Patent: May 2, 2017

(54) ARRANGEMENT AND METHOD FOR DETERMINING THE POSITION OF AN ANIMAL

(75) Inventors: Bohao Liao, Sollentuna (SE); Fulin Xiang, Älvsjö (SE)

(73) Assignee: DELAVAL HOLDING AB, Tumba (SE)

( * ) Notice: Subject to any disclaimer, the term of this patent is extended or adjusted under 35 U.S.C. 154(b) by 621 days.

(21) Appl. No.: 12/812,633

(22) PCT Filed: Jan. 16, 2009

(86) PCT No.: PCT/SE2009/050045
§ 371 (c)(1),
(2), (4) Date: Jul. 13, 2010

(87) PCT Pub. No.: WO2009/093967
PCT Pub. Date: Jul. 30, 2009

(65) Prior Publication Data
US 2010/0288198 A1 Nov. 18, 2010

(30) Foreign Application Priority Data
Jan. 22, 2008 (SE) ...................................... 0800149

(51) Int. Cl.
*A01J 5/017* (2006.01)
*A01K 1/12* (2006.01)
(Continued)

(52) U.S. Cl.
CPC .............. *A01K 1/126* (2013.01); *A01J 5/017* (2013.01); *A01J 5/0175* (2013.01); *A01K 1/12* (2013.01);
(Continued)

(58) Field of Classification Search
CPC ... A01J 5/007; A01J 5/01; A01J 5/017; A01K 1/12; A01K 1/123; A01K 1/126
(Continued)

(56) References Cited

U.S. PATENT DOCUMENTS 4,745,472 A * 5/1988 Hayes ........................... 348/141
5,412,420 A * 5/1995 Ellis ............................. 348/135
(Continued)

FOREIGN PATENT DOCUMENTS

DE 3742867 A1 * 7/1989 ................ A01J 5/00
NZ 285631 5/1997
(Continued)

OTHER PUBLICATIONS

Examination Report, issued Jan. 26, 2012 in corresponding New Zealand Application No. 586160, 5 pages.
(Continued)

*Primary Examiner* — Son T Nguyen
(74) *Attorney, Agent, or Firm* — Young & Thompson

(57) ABSTRACT

An arrangement, which is provided for determining the position of an animal, comprises a three-dimensional camera directed towards the animal and provided to record a three-dimensional image of the animal, and image processing means is provided for detecting the animal and determining its position in at least one spatial dimension based on the three-dimensional image of the animal. The image processing means may form a three-dimensional surface representation of a portion of the animal from the three-dimensional image of the animal, analyze the surface of the three-dimensional surface representation, and determine the position of the animal based on the analysis of the surface of the three-dimensional surface representation.

18 Claims, 2 Drawing Sheets

(51) Int. Cl.
*G01S 5/16* (2006.01)
*G01S 11/12* (2006.01)
*G01S 17/89* (2006.01)

(52) U.S. Cl.
CPC ................ *G01S 5/16* (2013.01); *G01S 11/12* (2013.01); *G01S 17/89* (2013.01)

(58) Field of Classification Search
USPC ..................... 119/14.02, 14.03, 14.08, 14.18
IPC .................................................. A01J 5/00,5/17
See application file for complete search history.

(56) References Cited

U.S. PATENT DOCUMENTS

| | | | |
|---|---|---|---|
| 5,979,359 A * | 11/1999 | Hansson | 119/14.08 |
| 6,323,942 B1 | 11/2001 | Bamji | |
| 6,974,373 B2 * | 12/2005 | Kriesel | 452/157 |
| 2003/0168014 A1 * | 9/2003 | Aarts et al. | 119/14.02 |
| 2004/0216679 A1 * | 11/2004 | Ealy et al. | 119/14.08 |
| 2005/0136819 A1 * | 6/2005 | Kriesel | 452/157 |
| 2006/0126903 A1 * | 6/2006 | Sharony | 382/110 |
| 2007/0215052 A1 * | 9/2007 | Metcalfe et al. | 119/14.08 |
| 2008/0257268 A1 * | 10/2008 | Gudmundsson et al. | 119/14.08 |
| 2010/0186675 A1 * | 7/2010 | Van Den Berg | A01J 5/0175 |
| | | | 119/14.03 |

FOREIGN PATENT DOCUMENTS

| | | |
|---|---|---|
| WO | WO 9807311 | 2/1998 |
| WO | WO 9903064 | 1/1999 |
| WO | WO 00/11936 | 3/2000 |
| WO | WO 02/102142 | 12/2002 |
| WO | WO 2005094565 | 10/2005 |

OTHER PUBLICATIONS

International Search Report of PCT/SE2009/050045, mailed on Apr. 27, 2009, 4 pages.

Office Action mailed Apr. 23, 2013 by New Zealand Intellectual Property Office in counterpart New Zealand Patent Application No. 609543.

* cited by examiner

ARRANGEMENT AND METHOD FOR DETERMINING THE POSITION OF AN ANIMAL

This is a U.S. National Phase application of PCT/SE2009/050045, filed Jan. 16, 2009, which claims priority to Swedish Patent Application Number 0800149-7, filed Jan. 22, 2008, both of which are incorporated herein by reference in their entireties.

TECHNICAL FIELD OF THE INVENTION

The present invention generally relates to animal farming, and in particular the invention relates to arrangements and methods for determining positions of animals.

DESCRIPTION OF RELATED ART AND BACKGROUND OF THE INVENTION

WO 2007/050012 discloses a visual detection arrangement in a milking system comprising a robot arm for attaching a teat cup to a teat of a milking animal, and a control device for controlling the movement of the robot arm. The detection arrangement comprises first visual detection means provided on the robot arm for repeatedly determining the teat position relative the robot arm and second visual detection means directed towards the milking animal.

The second visual detection means is provided for detecting the position of the animal in a longitudinal direction, and the control device is initially provided for controlling the movement of the robot arm based on information of the position of the teat of the animal relative the animal itself, and on the detected longitudinal position of the animal. The second visual detection means is preferably a two-dimensional camera, and is located beside the milking animal when being in the milking box, and essentially on a level with the teats of the milking animal, and directed essentially in a direction y which is orthogonal to the longitudinal direction x of the milking animal.

SUMMARY OF THE INVENTION

A drawback of the detection arrangement disclosed in WO 2007/050012 is that it is difficult to digitally process the two-dimensional image to obtain a reliable position of the milking animal. Typically, the position is found by recognizing the outer contour of the milking animal. However, noise, reflections, and background may obscure the image to such an extent that the position of the milking animal cannot be determined, or even worse, so that an incorrect position is determined. The noise and background is difficult to suppress.

Further, the color of the milking animal, the texture of its surface, etc. may vary from milking animal to milking animal, which makes segmentation and feature recognition in the images recorded more difficult.

Also, the method may be slow, which means prolonged milking times and in the end a lower milk production.

Accordingly, it is an object of the present invention to provide an arrangement and a method for determining the position of an animal, which alleviates or mitigates the drawbacks of the prior art approach as set forward above.

It is a further object of the invention to provide such arrangement and method, which are robust, effective, fast, precise, accurate, reliable, safe, easy to use, and of low cost.

These objects among others are, according to the present invention, attained by arrangements and methods as claimed in the appended patent claims.

According to one aspect of the invention an arrangement is provided for determining the position of an animal. The arrangement comprises a three-dimensional camera, preferably a time-of-flight camera, directed towards the animal and provided to record a three-dimensional image of the animal; and image processing means provided for detecting the animal and determining its position in at least one spatial dimension based on the three-dimensional image of the animal. More in detail, the image processing means is provided (i) to form a three-dimensional surface representation of a portion of the animal from the three-dimensional image of the animal, (ii) to analyze the surface of the three-dimensional surface representation, and (iii) to determine the position of the animal based on the analysis of the surface of the three-dimensional surface representation.

By the invention noise and background can easily be rejected. Since the surface structure is analyzed, phenomena like the color and texture, which affect the pixel values of an ordinary two-dimensional image, are entirely avoided. The position can be determined fast, accurately, and precisely.

Preferably, the three-dimensional camera is located above the animal and is directed downwards towards the animal and the position of the animal is the position of the animal in a longitudinal direction. The portion of the animal, of which a three-dimensional surface representation is made, may then include the back and the backside of the animal.

However, the invention is not limited in this respect. The camera may be located at different positions and be directed towards the animal in different directions.

Further, the position of the animal in a lateral direction orthogonal to the longitudinal direction may alternatively or additionally be determined as well as the orientation, i.e. rotation, of the animal with respect to a horizontal reference line.

In further detail, the processing may include the localization of the spinal ridge of the animal and the comparison of heights of portions of the surface of the three-dimensional surface representation located adjacent one another in a direction essentially parallel with the extension of the spinal ridge. Preferably, the portions of the surface of the three-dimensional surface representation located adjacent one another are spaced apart from the spinal ridge in a direction essentially orthogonal to the extension of the spinal ridge. Hereby, inaccuracies caused by the presence the tail bone and tail can be avoided.

In one embodiment the above arrangement is implemented in a milking system, such as a rotary milking system, comprising a milking stall for housing the animal during milking thereof, wherein the arrangement is provided for determining the position of the animal in the milking stall. The milking system may comprise a robot for attaching teat cups to the teats of the animal, where the robot is adapted to move the teat cups towards the udder of the animal based on the position of the animal as determined by the present invention.

By such arrangement the control device may control the robot arm very fast and accurately. The three-dimensional real time measurements and the subsequent processing of the measurement data provide high quality information extremely fast and as a result the milking system is capable of operating at higher speed. The milking time will be shorter and the throughput of animals is increased.

In another embodiment the above arrangement is implemented in a pre- or post-treating station for treating the animal prior to, or subsequent to, the milking of the animal, wherein the arrangement is provided for determining the position of the animal in the pre- or post-treating station. The pre- or post-treating station comprises a device for spraying the teats of the animal based on the determined position of the animal. Hereby, the pre- or post-treating station can be accurately and precisely controlled, thereby minimizing the amount of treatment substance required, still avoiding problems with insufficient treatment of the animal.

In still another embodiment the above arrangement is implemented in an animal traffic controlling arrangement comprising at least one gate device, wherein the arrangement is provided for determining the position of the animal at the gate device. Hereby, gate devices of the animal traffic controlling arrangement can be accurately and precisely controlled, thereby reducing the risk of directing animals incorrectly or loosing track of animals.

Further embodiments of the inventive arrangement are set out in the dependent claims.

According to a second aspect of the invention a method for determining the position of an animal is provided. According to the method a three-dimensional camera is directed towards the animal and a three-dimensional image of the animal is recorded. The three-dimensional image of the animal is thereafter processed to detect the animal and determine its position in at least one spatial dimension. The processing comprises forming a three-dimensional surface representation of a portion of the animal from the three-dimensional image of the animal, analyzing the surface of the three-dimensional surface representation, and determining the position of the animal based on the analysis of the surface of the three-dimensional surface representation.

An advantage of the present invention is that the position of the animal is found very quickly and precisely. Noise and background are easily suppressed.

Further characteristics of the invention, and advantages thereof, will be evident from the following detailed description of preferred embodiments of the present invention given hereinafter and the accompanying FIGS. 1-4, which are given by way of illustration only, and are thus not limitative of the present invention.

BRIEF DESCRIPTION OF THE DRAWINGS

In FIG. 3 the arrangement is implemented in a pre- or post-treating station for treating the animal prior to, or subsequent to, the milking of the animal, and in FIG. 4 the arrangement is implemented in an animal traffic controlling arrangement.

DETAILED DESCRIPTION OF EMBODIMENTS

Figure 1:
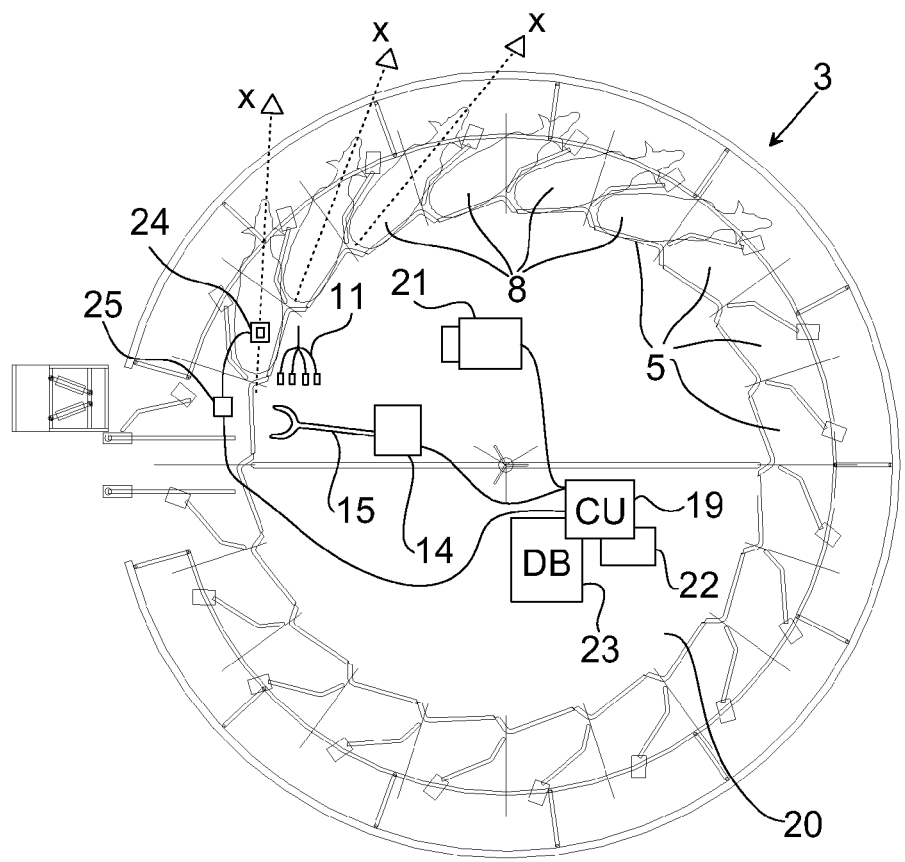
FIG. 1 displays in a top view a schematically outlined milking system including an arrangement for determining the position of an animal according to an embodiment of the invention.

In FIG. 1 is shown a milking system, in which an arrangement for determining the position of an animal according to an embodiment of the invention is implemented.

The rotary milking system 3 comprises a plurality of milking stalls 5, which animals 8 enter in a sequential order.

Each of the milking stalls 5 comprises milking equipment including teat cups 11 that are attached to the teats of the animal present in the milking stall prior to milking. For sake of simplicity teat cups 11 are illustrated only for one of the milking stalls 5. The rotary milking system 3 may be of parallel, tandem, or herringbone configuration.

In the parallel configuration the longitudinal directions of the milking stalls and of the animals therein extend radially (the animals stand side by side), in the tandem configuration the longitudinal directions of the milking stalls and of the animals therein extend circumferentially (the animals stand one after the other), and in the herringbone configuration, which is illustrated in FIG. 1, the longitudinal directions x of the milking stalls and of the animals therein extends partly radially, partly circumferentially.

A robot 14 provided with a robot arm 15 is provided for automatically attaching teat cups 11 to the teats of the animals 8 present in the milking stalls 5 under the control of a control device 19, which is operatively connected to the milking robot 14. The milking robot 14 is preferably stationary with respect to a rotatable carousel or rotating platform 20 of the rotary milking system 3, which forms the support for the milking stalls 5. Alternatively, the milking robot 14 is movable back and forth in e.g. a circumferential direction.

The rotating platform 20 may, for each of the animals, be kept still while the milking robot 14 automatically attaches teat cups 11 to the teats of the animal 8, and is rotated there in between. Alternatively, the rotating platform is rotated continuously during the attachment of the teat cups and the milking of the animals 8.

In order to determine positions of the teats of the animals 8 present in the milking stalls 5, and thus be capable of moving the teat cups 11 to the teats of the animal, a camera 21 is provided. The camera 21 may e.g. be a two- or three-dimensional camera.

The camera 21 is, for each of the animals in the milking stalls, directed towards the udder of the animal, wherein the camera 21 repeatedly records images of the udder of the animal. Image processing means 22 is provided, for each of the animals, for repeatedly detecting the teats of the animal and determining their positions by a calculation method based on the repeatedly recorded images of the udder of the animal.

The image processing means 22 is preferably implemented as a software module in the control device 19, which thus is operatively connected to the camera 21, or in any other device operatively connected to the camera 21 and to the control device 19. Yet alternatively, the software module may be integrated into the three-dimensional camera 21 itself.

According to the invention an arrangement is provided for determining the position of an animal 8 in a milking stall 5 and comprises a three-dimensional camera 24 directed towards the animal 8 and provided to record a three-dimensional image of the animal 8 and an image processing device 25 provided for detecting the animal 8 and determining its position in at least one spatial dimension, preferably but not necessarily the longitudinal direction x of the milking stall 5, based on the three-dimensional image 27 of the animal. The position of the animal refers to a position of a fixed reference point of the animal, which is time invariant. A typical fixed reference point is an end point of the animal, such as the back end, the front end, the highest position of the spinal ridge, the tail bone etc. which gives information as to the location of the rest of the animal. In this respect, the position of the udder/teats of the animal is not a good reference point since it varies with time since last milking and milk generation capacity.

Generally, the image processing device 25 is provided to form a three-dimensional surface representation or elevation or topography map of a portion of the animal from the three-dimensional image of the animal 8, to analyze the surface of the three-dimensional surface representation, and to determine the position of the animal 8 based on the analysis of the surface of the three-dimensional surface representation. More details of the image processing will be given further below.

The three-dimensional camera 24 may be a range camera such as time-of-flight camera or an active wavefront sampling (AWS) camera. Alternatively, the three-dimensional camera 24 is based on other technology such as stereo vision.

A commercially available time-of-flight camera that can be used in the present invention is the SwissRanger SR3000 from Mesa Imaging AG, Switzerland. The SR3000 is a general purpose range three-dimensional real time imaging camera. The camera can easily be connected to a computer via USB 2.0, enabling straightforward measurement of real-time depth maps. Designed for operation under lighting conditions, the compact camera is offered with a complete visualization software program.

The camera and the technique behind the camera are further disclosed in the publications "An all-solid-state optical range camera for 3D real-time imaging with sub-centimeter depth resolution (SwissRanger™)" and "3D-Imaging in Real-Time with Miniaturized Optical Range Camera" by T. Oggier et al. and available at the Mesa Imaging AG Internet site http://www.mesa-imaging.ch/ on Dec. 27, 2007. The contents of the above publications are hereby incorporated by reference.

Preferably, the three-dimensional camera 24 is located above the animal and is directed downwards towards the animal. It may be mounted in a ceiling or a frame of the rotary milking system 3. Preferably, the three-dimensional camera 24 is stationary with respect to the rotating platform 20 of the rotary milking system and with respect to the robot arm 15 of the milking robot 14.

Figure 2:
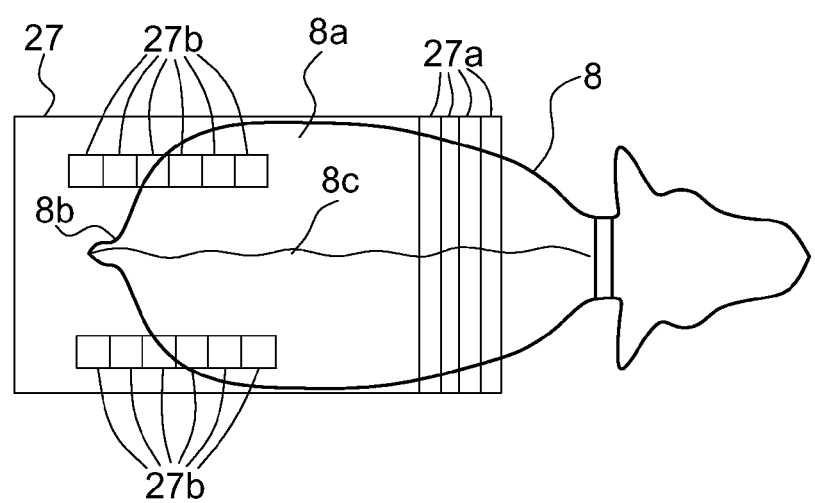
FIG. 2 illustrates an image recorded by the arrangement of FIG. 1 superimposed on an animal. Several regions used in the digital image processing are indicated.

FIG. 2 illustrates an image recorded by the arrangement of FIG. 1 superimposed on an animal. Advantageously, the portion of the animal, which is imaged, includes the back 8a and the backside 8b of the animal 8 as can be seen in FIG. 2. Several regions used in the digital image processing are indicated even if it is the regions of the three-dimensional surface representation, which are actually used in the processing. The three-dimensional surface representation may be made of the entire recorded three-dimensional image or only of a portion thereof. Thus, the intensity or color values of the pixels of the image recorded may be discarded and not at all used in the processing.

The image processing may be performed in the following manner. The spinal ridge 8c of the animal 8 is found by means of analyzing adjacent elongated regions or windows 27a (lying perpendicular to a longitudinal direction x of the milking stall 5 and a supposed longitudinal direction of the animal 8) of the three-dimensional surface representation and searching for a maximum height value of the surface in each elongated region 27a. Preferably the elongated regions 27a are analyzed from the front end of the surface representation and backwards. In such manner the spinal ridge 8 can be found and located and it can be determined if the animal stands in the longitudinal direction or at an inclined angle thereto (in the horizontal plane). If it is found that the animal stands at an inclined angle with respect to the longitudinal direction, the three-dimensional surface representation may be aligned by means of rotation. The elongated regions 27a are preferably very narrow (e.g. a single pixel wide) and cover advantageously a major portion of the surface representation in the transverse direction so as to ensure that the spinal ridge can be found.

To find the position of the animal, i.e. a back end of the animal, height values of small portions or windows 27b of the surface of the three-dimensional surface representation located adjacent one another in a direction essentially parallel with the extension of the spinal ridge 8c are compared. The small portions 27b located adjacent one another are spaced apart from the spinal ridge 8c in a direction essentially orthogonal to the extension of the spinal ridge to avoid the area of the tail bone and tail. Preferably, height values of small portions 27b of the surface of the three-dimensional surface representation located adjacent one another at each side of the spinal ridge 8c are compared. The comparison is made from an interior part of the three-dimensional surface representation and backwards. When the height values of small portions 27b of the surface of the three-dimensional surface representation located adjacent one another differ by a sufficient amount the back end of the animal 8 is found. Generally spoken, it may be the longitudinal spatial derivative of the height of the surface of the three-dimensional surface representation, the height of the surface of the three-dimensional surface representation, or a combination of both that is followed until some condition for termination is reached.

During the processing the pixel values may be averaged within a circle around the pixel in order to reduce the impact of noise. The images may further be filtered initially to reduce noise and to remove unreliable pixel values.

The size of the regions or windows 27a-b may be smaller and smaller the closer one reaches the back of the animal in order to avoid finding false maximum height values. The first elongated region or window 27a has to be large enough such that the spinal ridge can be found. Such adaptive window size may improve the result considerably.

The camera and processing may operate at least 10 Hz frame rate in order to track movement of the animal.

The embodiment of FIG. 1 may be of particular importance in a milking system where a detection device is used to detect the udder of an animal in a milking stall based on the prior knowledge of where in the milking stall the animal is located and possibly on the physical dimensions of the animal itself.

Thus, the control device 19 may, for each of the animals, hold information in, or receive information from, a database 23 regarding the position of the udder of the animal relative the animal itself. This may be a single approximate figure valid for all the animals or it may be a figure for each of the animals. Further, the control device 19 directs the three-dimensional camera 21 and controls the robot arm 15 of the milking robot 14 to move towards the udder of the animal based on the information of the position of the at least one teat of the animal relative the animal itself, and on the detected position of the animal in the spatial dimension as made by the inventive arrangement. To this end, the inventive arrangement is operatively connected to the control device 19.

It shall be appreciated that the invention is not limited with respect to the location of the camera, the directing of the camera, or the position of the animal to be determined. The camera may be located at different positions than above the animal and be directed towards the animal in different directions. Further, the position of the animal in a lateral direction orthogonal to the longitudinal direction may alternatively or additionally be determined as well as the orientation, i.e. the above mentioned angle, of the animal with respect to a horizontal reference line.

It shall further be appreciated that the arrangement of the present invention may be used as a multifunctional detection system for detecting any of the following: (i) presence of an animal in a milking stall, (ii) the behavior of a animal, (iii) the activity of a animal, (iv) the body shape of a animal, (v) an incorrect teat cup attachment, (vi) a teat cup kick-off, (vii) presence of an obstacle in the working area of the milking robot, (viii) a parameter related to the operation of the milking robot, and (ix) a parameter related to the operation of the three-dimensional camera.

Figure 3:
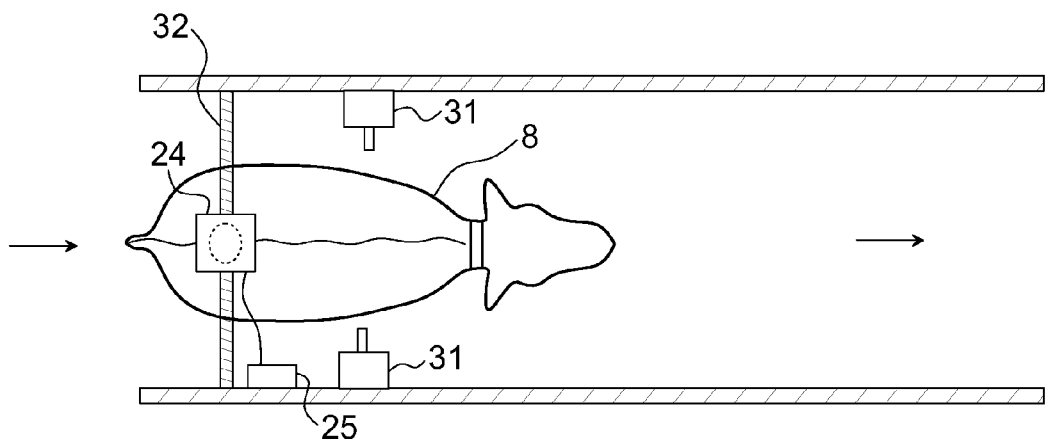
FIGS. 3 and 4 display each in a top view an arrangement for determining the position of an animal according to an embodiment of the invention.

FIG. 3 displays in a top view an arrangement for determining the position of an animal according to a further embodiment of the invention. The inventive arrangement, including the three-dimensional camera 24 and the image processing device 25, is implemented in a pre- or post-treating station for treating the animal prior to, or subsequent to, the milking of the animal, and is provided for determining the position of the animal 8 in the station. Preferably, the pre- or post-treating station comprises a device 31 for spraying the teats of the animal 8, wherein the spraying device 31 is operatively connected to the inventive arrangement and adapted to spray the teats of the animal 8 based on the determined position of the animal 8 in the pre- or post-treating station.

The spraying device or one or several nozzles thereof may be held by a robot arm, which can be controlled, or may be mounted at the sides of the passageway of the station or in the floor, wherein the spraying can be triggered by the animal being in a correct position.

Figure 4:
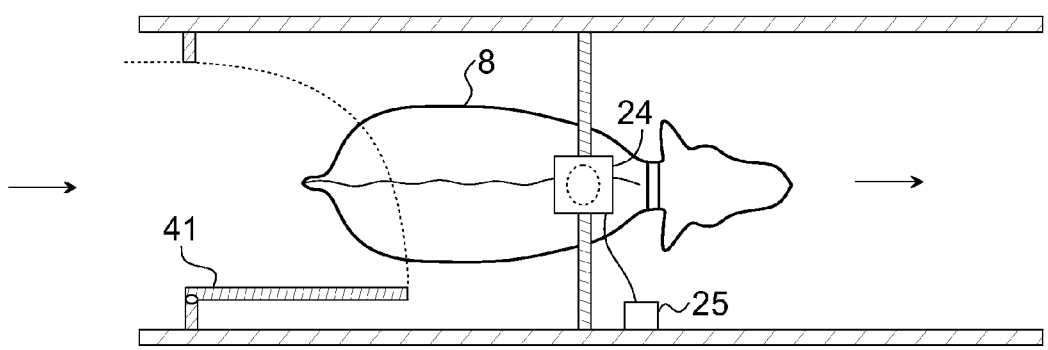

FIG. 4 displays in a top view an arrangement for determining the position of an animal 8 according to a yet further embodiment of the invention. The arrangement is implemented in an animal traffic controlling arrangement. The animal traffic controlling arrangement comprises a gate device 41 and the inventive arrangement, including the three-dimensional camera 24 and the image processing device 25, provided for determining the position of the animal at the gate device 41.

The object of this embodiment may be to avoid that many animals, i.e. a "train" of animals, pass a gate while only the first one of them is allowed to pass the gate or is identified correctly. That is, the gate may be automatically opened after the animal has been identified by an automatic animal identification device. The inventive arrangement may thus be present to identify exactly when the animal has passed the gate, at which point the gate can be closed directly, whereby further animals are prevented from pass before being identified. Similarly, the invention may detected if an identified animal does not pass the gate upon opening thereof, but backs away from the gate, or if another animal takes the opportunity to pass the gate. As a result, the present embodiment provides for an automatic animal traffic controlling arrangement, which is more failsafe and which more accurately and precisely controls the traffic of the animals and keeps track on the locations thereof.

In particular, if the gate device is located at an entry to a milking parlor, the invention secures that the animal, which is being milked, will be securely and correctly identified.

The invention claimed is:

1. An arrangement for determining a position of an animal in a milking stall, comprising:
a first three-dimensional camera configured to be directed towards at least one teat of the animal for recording a first three-dimensional image of the at least one teat at a first angle of view of the animal:
a second three-dimensional camera configured to be directed towards the animal for recording a second three-dimensional image of the animal at a second angle of view of the animal different than the first angle of view, wherein the second three-dimensional camera is located above the animal and is directed downwards towards the animal; and
an image processing device that:
detects the animal and determines the position of the animal in at least one spatial dimension using the second three-dimensional image of the animal, wherein the at least one spatial dimension is a substantially longitudinal direction of the milking stall;
forms a three-dimensional surface representation of a top portion of the animal from the second three-dimensional image of the animal;
analyzes a surface of the three-dimensional surface representation by comparing heights of portions of the surface of the three-dimensional surface representation that are located adjacent to one another; and
determines the position of the animal in the substantially longitudinal direction of the milking stall based on the analysis of the surface of the three-dimensional surface representation.

2. The arrangement of claim 1, wherein the second three-dimensional camera is a three-dimensional time-of-flight camera.

3. The arrangement of claim 1, wherein the top portion of the animal includes the back and the backside of the animal.

4. The arrangement of claim 1, wherein the image processing device locates the spinal ridge of the animal by analyzing the surface of the three-dimensional surface representation.

5. The arrangement of claim 4, wherein the portions of the surface of the three-dimensional surface representation that are located adjacent to one another are in a direction essentially parallel with the spinal ridge.

6. The arrangement of claim 5, wherein the portions of the surface of the three-dimensional surface representation located adjacent one another are spaced apart from the spinal ridge in a direction essentially orthogonal to the spinal ridge.

7. The arrangement of claim 5, wherein the image processing device compares the heights of portions of the surface of the three-dimensional surface representation in a backward direction beginning from an interior part of the three-dimensional surface representation.

8. The arrangement of claim 1, further including:
a control device that directs the first three-dimensional camera towards the at least one teat based on the determined position of the animal.

9. The arrangement of claim 1, further including:
a robot arm that automatically attaches a teat cup to the at least one teat; and
a control device that controls the robot arm based on the first three-dimensional image and the determined position of the animal.

10. The arrangement of claim 1, wherein the image processing device locates the spinal ridge of the animal by analyzing adjacent elongated regions of the three-dimensional surface representation and is configured to determine the position by using the located spinal ridge.

11. The arrangement of claim 10, wherein the adjacent elongated regions are elongated in a direction perpendicular to a longitudinal direction of the animal.

12. The arrangement of claim 10, wherein the adjacent elongated regions are elongated in a direction perpendicular to a longitudinal direction of the milking stall.

13. The arrangement of claim 10, wherein the image processing device locates the spinal ridge of the animal by searching for a maximum height value of the surface in each elongated region.

14. A method for determining a position of an animal in a milking stall, comprising:

directing a first three-dimensional camera towards at least one teat of the animal to record a first three-dimensional image of the at least one teat at a first angle of view of the animal;

directing a second three-dimensional camera from above the animal downwards towards the animal and recording a second three-dimensional image of the animal at a second angle of view different than the first angle of view; and detecting the animal and determining the animal's position in at least one spatial dimension by image processing the second three dimensional image of the animal, wherein the at least one spatial dimension is a substantially longitudinal direction of the milking stall, and wherein the step of image processing comprises:

forming a three-dimensional surface representation of a portion of the animal from the second three-dimensional image of the animal;

analyzing a surface of the three-dimensional surface representation;

determining the position of the animal in the substantially longitudinal direction of the milking stall based on the analysis of the surface of the three-dimensional surface representation; and comparing heights of portions of the surface of the three-dimensional surface representation that are located adjacent to one another.

15. The method of claim 14, wherein the image processing further comprises locating the spinal ridge of the animal by analyzing adjacent elongated regions of the three-dimensional surface representation and further comprises determining the position by using the located spinal ridge.

16. The method of claim 15, wherein the image processing further comprises locating the spinal ridge by searching for a maximum height value of the surface in each elongated region.

17. The method of claim 14, wherein the portions of the surface of the three-dimensional surface representation that are located adjacent to one another are in a direction essentially parallel with the spinal ridge of the animal.

18. The method of claim 14, wherein the image processing further comprises comparing heights of portions of the surface of the three-dimensional surface representation in a backward direction beginning from an interior part of the three-dimensional surface representation.

* * * * *